United States Patent [19]
Larson

[11] 4,061,166
[45] Dec. 6, 1977

[54] FLAIL DELIMBER

[76] Inventor: Robert W. Larson, P.O. Box 1148, Thunder Bay, Ontario, Canada, P7C 4X9

[21] Appl. No.: 737,480

[22] Filed: Nov. 1, 1976

[51] Int. Cl.² .................................................. B27L 1/00
[52] U.S. Cl. ...................................... 144/2 Z; 56/208; 144/208 J
[58] Field of Search .................... 241/191; 56/208; 144/208 R, 2 Z, 208 J; 83/368

[56] References Cited
U.S. PATENT DOCUMENTS

| 2,341,486 | 2/1944 | Suertfeger | 144/208 J |
| 2,501,925 | 3/1950 | Yensen et al. | 144/208 J |
| 3,018,972 | 1/1962 | Steinmetz | 241/191 |
| 3,849,836 | 11/1974 | Bernard et al. | 83/368 |
| 3,858,471 | 1/1975 | Valente | 83/368 |

Primary Examiner—Othell M. Simpson
Assistant Examiner—W. D. Bray
Attorney, Agent, or Firm—Johnson & Hicks

[57] ABSTRACT

A mobile tree delimber having a flail type delimber movably mounted thereon and controllably raised and lowered by sensing means automatically to maintain a selected relative position between the flail delimber unit and the tree or group of trees being processed thereby maximizing impact forces of the flail members on the limbs being removed. A further delimber consists of a mobile vehicle having two or more flail type delimber units individually movably mounted thereon in side-by-side relation and each supported for movement in a vertical plane and means for raising and lowering the respective flail delimber units independent of one another.

11 Claims, 15 Drawing Figures

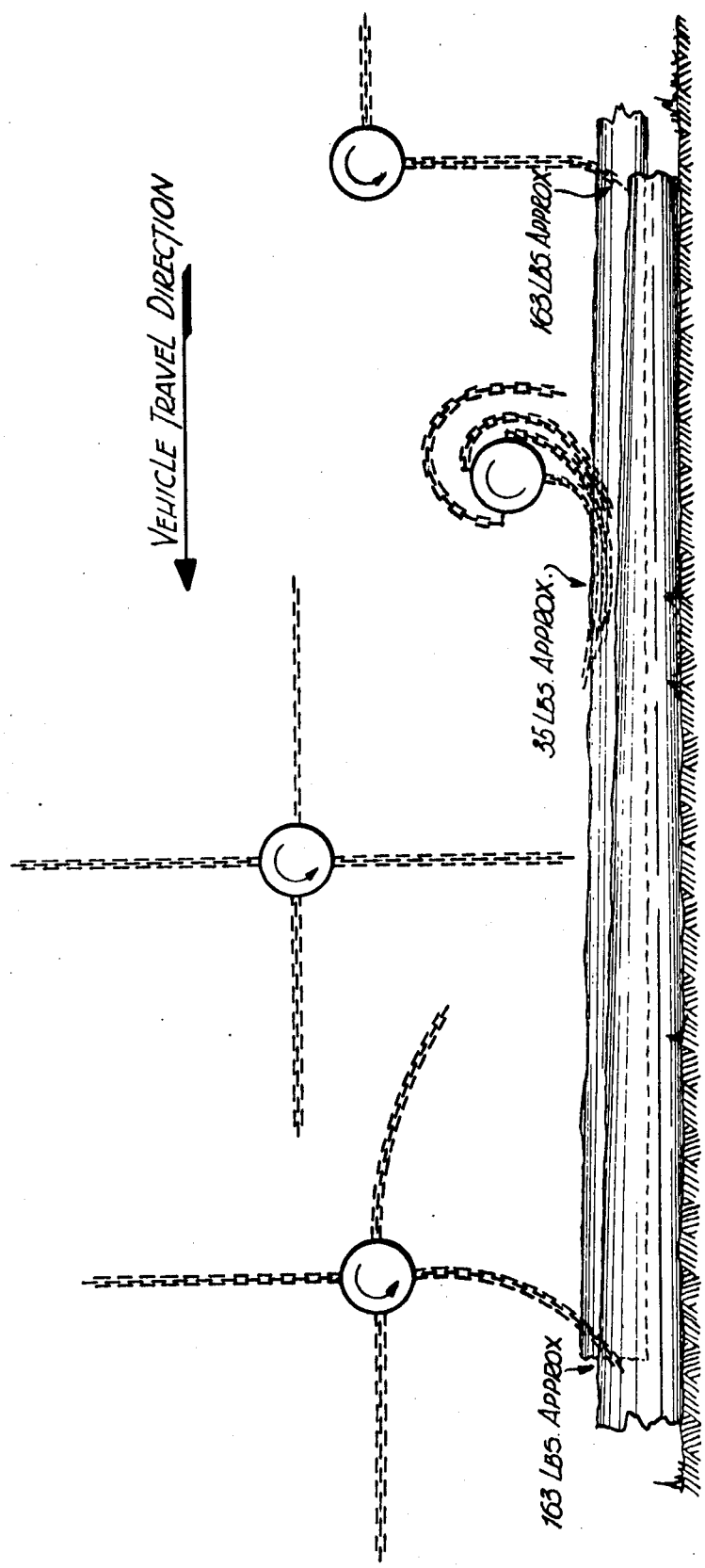

FLAIL DELIMBER

FIELD OF THE INVENTION

This invention relates to apparatus for processing trees and particularly to improvements in flail type delimbers.

BACKGROUND OF THE INVENTION

Flail tree processing units have been known for many years and initially were used for removing bark from logs. Typically one such device is disclosed in Canadian Pat. No. 454,353 issued Feb. 1, 1949 to D. Mathewson et al. In later developments the flail units were utilized to remove limbs from the trunk of a tree as exemplified by Horncastle Canadian Pat. No. 598,362 issued May 17, 1960. The Horncastle device consists of a pair of driven flail units spaced apart from one another and between which a single tree is propelled endwise by a conveyor. In a later development as exemplified by Canadian Pat. No. 964,965 issued Mar. 25, 1975 to S. Michael, a number of trees are delimbed simultaneously by moving a flail unit longitudinally along a pile of trees lying on the ground.

In using flail delimbers there are two dominant factors which affect its effectiveness. One is impact which depends on speed, weight and length of the chain utilized provided generally by design considerations and the other is control of the impact. This is necessary if one wishes to ensure the limb receives the maximum impact from the chain. In the prior art devices the control of impact has mainly been accomplished by the operator viewing the operation and manually adjusting the relative position of the flail unit and log or logs being processed. Since the operator's visibility of the flails acting on the trees is virtually nil, controlling the force of impact in this manner is no more than guesswork and is extremely inefficient. Thus, with the prior art devices many passes over a tree or group of trees, as the case may be, are required to provide a satisfactory limbing operation. With existing machines the number of passes required are four to six and even more in some instances.

Also, presently known flail delimbers consist of a single straight horizontal flail, as for example disclosed in the aforementioned Canadian Pat. No. 964,965, and it will be obvious that, when utilized on a pile of trees, not all of the flail units across the length of the flail drum contact the trees to be limbed with the same impact forces. This stems from the fact that when a pile of trees are lying on the ground there is a hump or crown to the pile and the link chains of the flail unit strike the trees on the higher part of the pile with greater force than those trees lying close to or on the ground at the edges of the pile. Thus, in a straight horizontal flail of the prior art devices, most of the energy is consumed at the high point of the pile (i.e. at the center of the pile) with less energy consumed on the outer edges. In this situation, if there is satisfactory limbing at the center of the pile, there will be unsatisfactory limbing, if any, at the outer edges of the pile.

SUMMARY OF THE INVENTION

Accordingly, a principal object of the present invention is to provide a flail delimber with means for automatically maintaining a selected relative position between the flail delimber and tree being processed to maintain an impact position for the flails relative to the limbs which will produce an efficient limbing operation.

A further principal object of the present invention is to provide a multi-section flail with each section being individually controlled for maintaining proper height across the width of a pile of trees being limbed minimizing the number of passes required.

In keeping with the foregoing, there is provided in accordance with one aspect of the present invention, apparatus for delimbing trees comprising: (a) a mobile self-propelled vehicle; (b) at least one flail delimber movably mounted on said vehicle for movement in a vertical plane; (c) means connected to said vehicle and to the flail delimber for raising and lowering the latter; and (d) sensing means controlling said raising and lowering means to automatically maintain a selected relative position between the flail delimber and a tree lying on the ground being processed during movement of the vehicle longitudinally along the tree to thereby maximize impact forces of the flail members on the limbs being removed.

In accordance with a further aspect of the present invention there is provided a device for delimbing trees comprising a plurality of flail delimbers individually movably mounted on a support for movement in a vertical plane and means for raising and lowering the respective flail delimbers independent of one another.

In accordance with a further aspect of the present invention there is provided a device of the foregoing type wherein the plurality of flail delimbers are each controllably raised and lowered by sensing means automatically maintaining a selected relative position between the respective flail delimbers and a group of trees being processed thereby maximizing impact forces of the flail members on the limbs being removed.

BRIEF DESCRIPTION OF THE DRAWINGS

The invention is illustrated by way of example with reference to the accompanying drawings wherein:

FIG. 6 is a diagrammatic side elevational view illustrating different relative positions of the flail members relative to a tree;

DETAILED DESCRIPTION OF THE INVENTION

Figure 1:
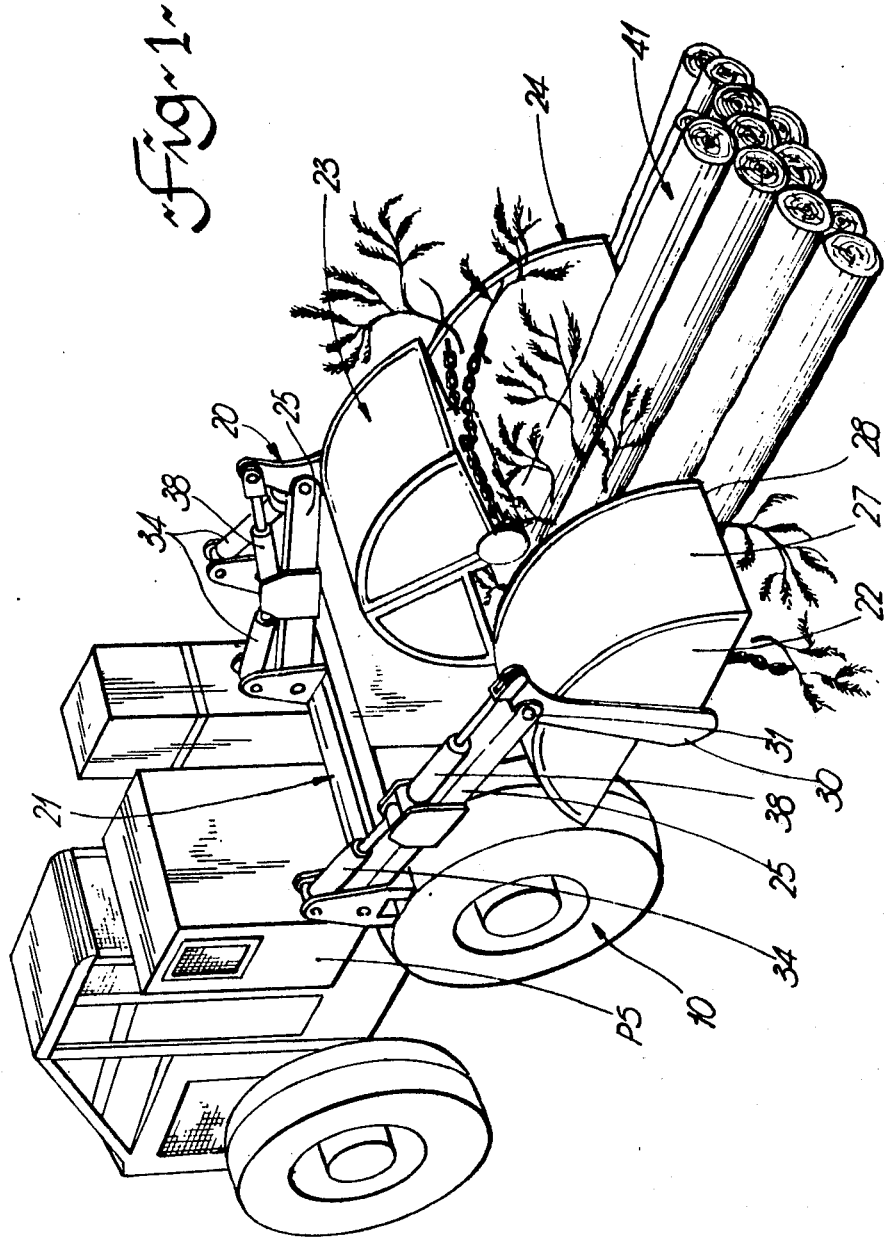
FIG. 1 is an oblique view of a mobile tree delimber constructed in accordance with the present invention.

Referring now in detail to the drawings, there is illustrated a mobile vehicle 10 on which there is mounted a flail type delimbing assembly 20 constructed in accordance with one aspect of the present invention. The delimbing assembly 20 consists of a mounting frame assembly 21 to which there are attached three individual flail delimbing units 22, 23 and 24 and also on which frame assembly there is mounted a power source for the delimbing units. The power source consists of a diesel engine designated PS driving a hydraulic pump or pumps located under a tank 26 for the hydraulic fluid. The power source, oil tank and pumps need not necessarily be mounted on the same frame as the delimbing units but in so doing the entire assembly is self-contained and may be readily mounted on the chassis of any existing mobile vehicle. It will, however, be obvious the power source 25 and oil tank, together with hydraulic pumps, may be mounted on the vehicle independent of the delimbing assembly.

Figure 2:
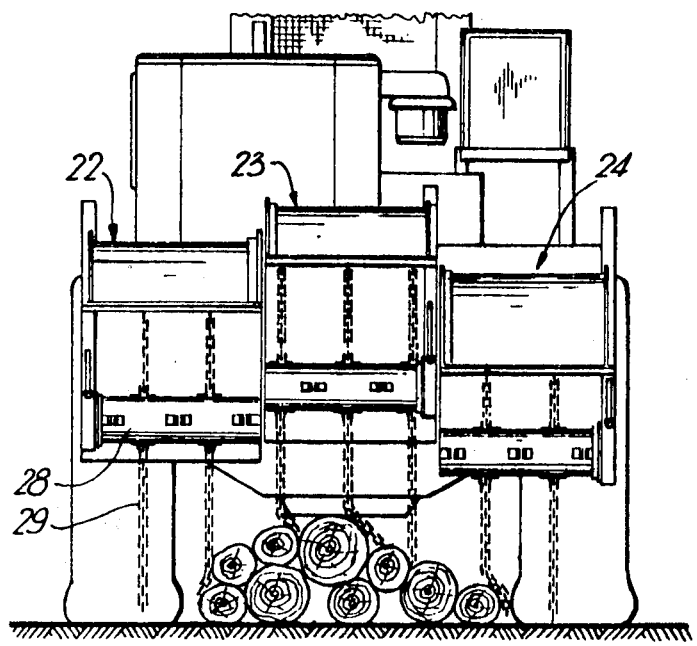
FIG. 2 is a front elevational view of the machine illustrated in FIG. 1.
Figure 3:
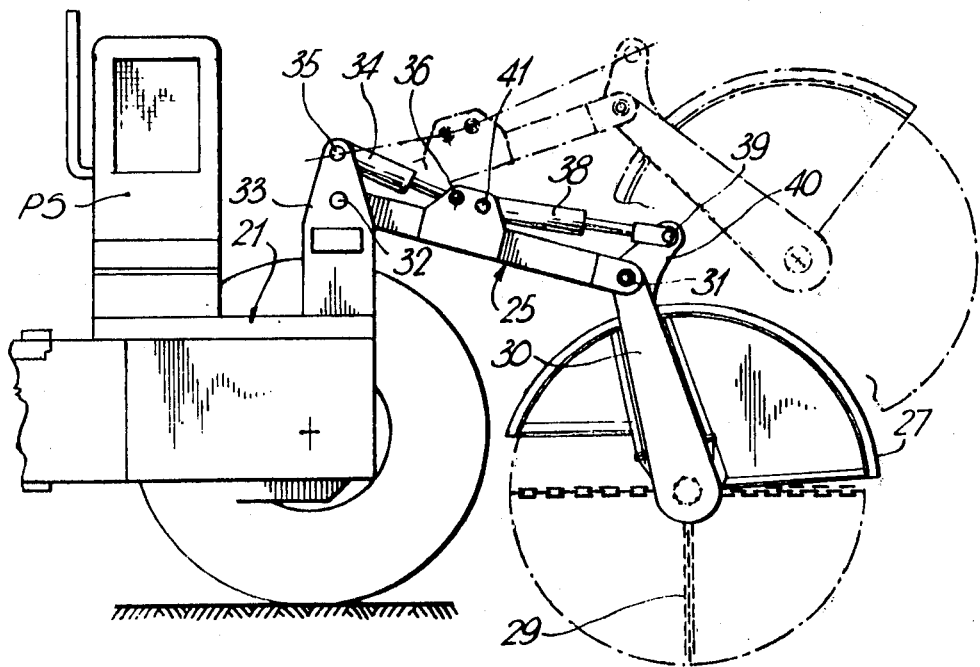
FIG. 3 is a side elevational view of the flail delimbing assembly portion of the machine illustrated in FIG. 1.

The delimbing units 22, 23 and 24 are connected to the mounting frame 21 by respective ones of three arms 25. Each flail delimbing unit 22, 23 and 24 consists of a partly circular open bottom housing 27 having a hub 28 journalled therein for rotation about an axis transverse to the direction of travel of the vehicle. A plurality of link chains, also referred to herein as flail members, are each attached at one free end thereof to the hub. The flail members are spaced apart from one another longitudinally along and circumferentially around the hub and project below the open bottom of the housing during rotation of the hub to remove limbs from trees lying on the ground. An arm 30 is rigidly secured to the housing and pivotally connected by a pin 31 to the arm 25. The opposite end of the arm 25 is pivotally connected by a pin 32 to the mounting frame 21. The arms 25 are raised and lowered by respective ones of three hydraulic piston cylinder assemblies 34 connected respectively at opposite ends by pins 35 and 36 to brackets 33 on the frame 21 and respective ones of the boom members 25. In FIG. 3 the lowermost position of the delimber unit is illustrated in solid line while the raised position is illustrated by broken line. Tilting of the housing of the respective delimber units is effected by respective ones of three individual hydraulic cylinder assemblies 38, one end of which is attached by a pivot pin 39 to a bracket extension 40 of arm 30 and, at the other end, by pin 41 to the arm 25. The individual delimbing units accordingly cannot only be raised and lowered but also tilted to provide for effective limbing. By raising and lowering the individual delimber units they may be located at different vertical elevations relative to one another and thus provide for effective limbing across the entire width of a pile of logs lying on the ground. The different relative vertical positions and with respect to a pile of logs on the ground are shown in FIG. 2 and also from such figure it will be seen that the three individual delimbing units 22, 23 and 24 are positioned closely adjacent one another in side-by-side relation transversely across the width of the vehicle for spanning the pile of logs. The position of a delimbing unit relative to the trees being processed is important particularly during summer operation when the limbs of the trees or branches are springy. To some extent the effectiveness of limbing can be controlled by having an appropriate number of flail members on each delimbing unit, running the delimbing unit at an appropriate speed and using link chains of appropriate weight and length. For total effectiveness, however, it is necessary to maintain a proper relative position of the delimbing unit and tree maximizing impact forces on the limbs with the chain units while utilizing minimum driving forces to rotate the hub of the delimber.

Figure 5:
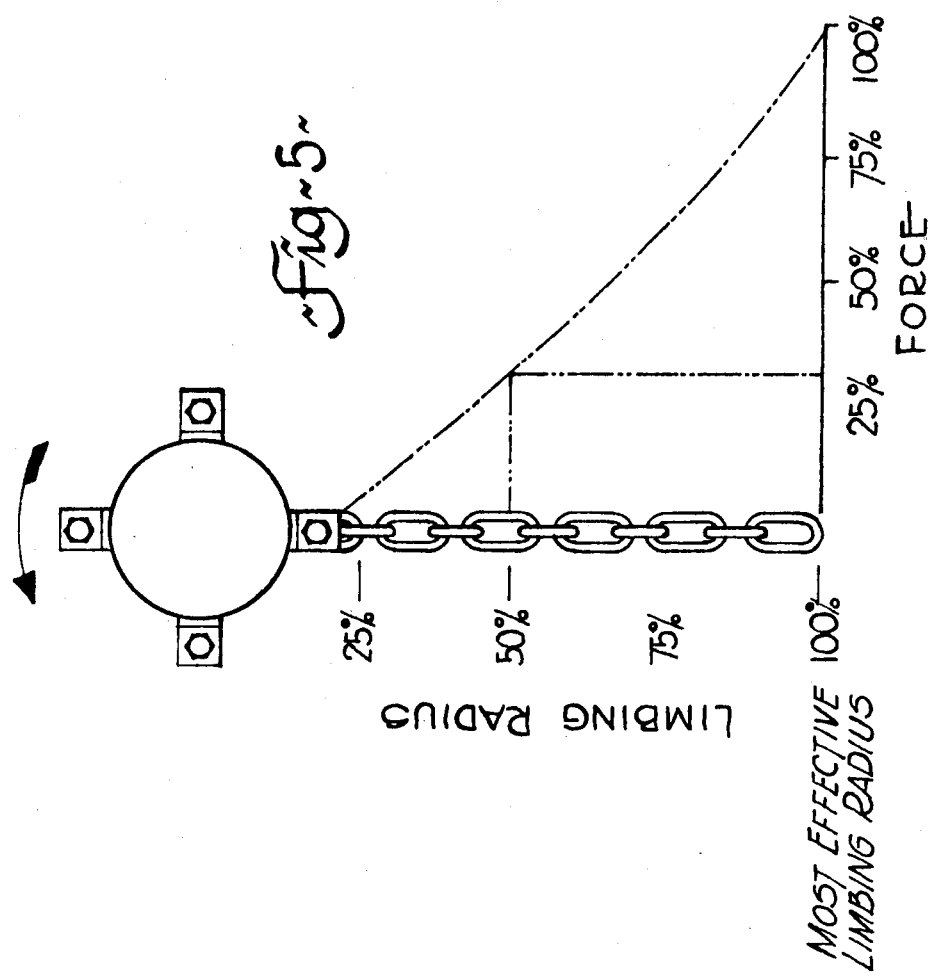
FIG. 5 graphically represents length of a flail member versus force of the same to remove limbs.

In FIG. 5 there is graphically represented the effect flail length has on the force applied to remove a limb. As an example, it can be seen that when the flail member is operating at 50% of its most effective limbing radius the force delivered thereby is 31% of maximum.

FIG. 6 diagrammatically illustrates various relative positions of the flail members relative to a tree lying on the ground and at positions A and D they are considered to provide effective limbing. The relative position illustrated at location B will not provide effective limbing nor will it at location C. At location B the flail members are too far removed and will strike the limbs at some distance from the trunk of the tree. At location C there will be very small impact forces due to the effective shortening in the radial extent of the flail members from the rotating hub to which they are attached. Locations B and C are also illustrative of a delimbing operation wherein the height of the delimber unit is manually controlled during a limbing operation. The more desirable relative positions of the flail members and trees being delimbed, illustrated at locations A and D, can be readily maintained utilizing automatic height control provided in accordance with a further aspect of the present invention and various means for automatically controlling the height are illustrated in FIGS. 7 to 13 inclusive.

Figure 8:
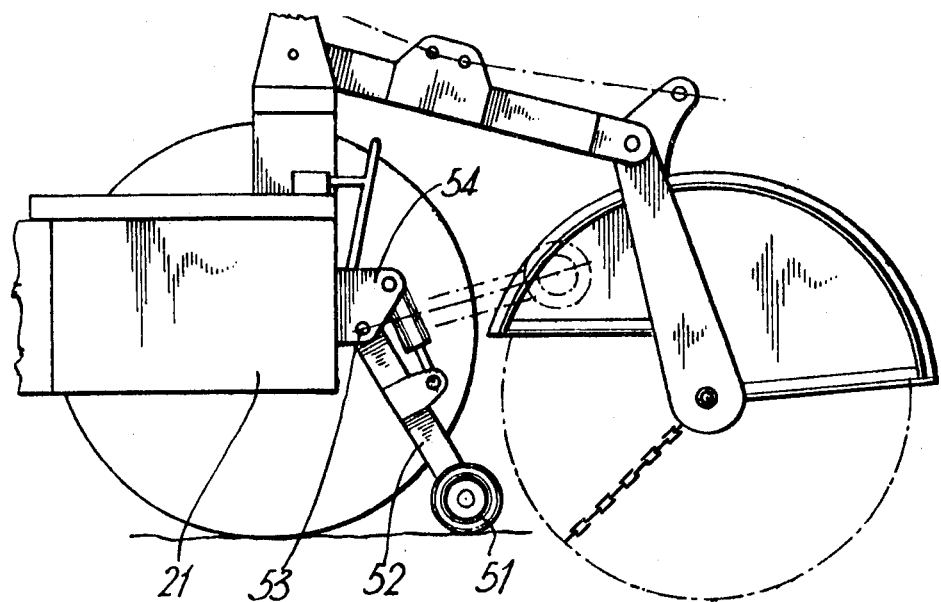
FIG. 8 is a side elevational view of FIG. 7.
Figure 7:
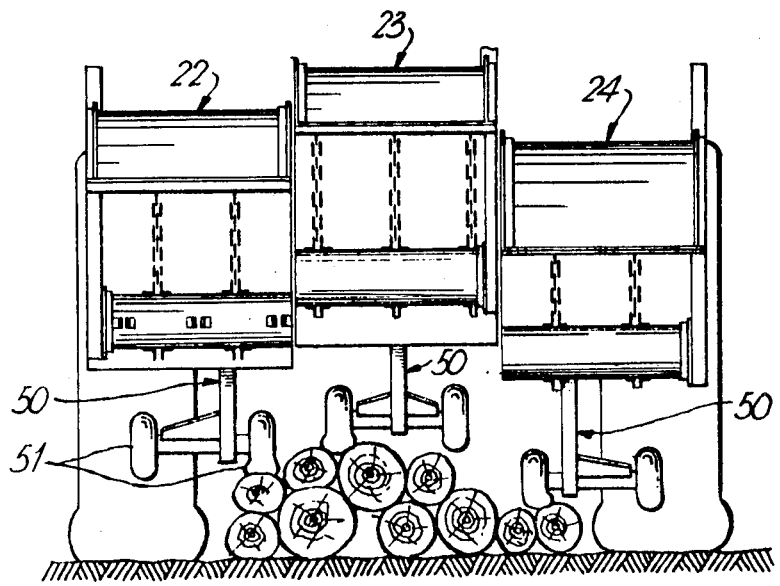
FIG. 7 is a front elevational view, similar to FIG. 2, but including sensors for automatic height control of the flail units.
Figure 10:
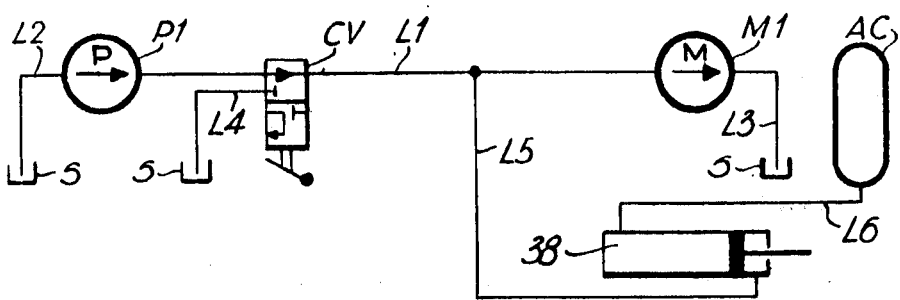
FIGS. 10 - 13 are schematics of various alternative means for automatic height control of the delimbing units.

Referring to FIGS. 7 and 8, each of the delimbing units 22, 23 and 24 are automatically raised and lowered by respective ones of three sensors designated 50 actuating valves which control the respective hydraulic piston cylinder assemblies 34. In the embodiment illustrated in FIGS. 7, 8 and 9, each sensor 50 has a pair of wheel units 51 mounted on one end of an arm 52, the other end of which is pivotally connected by a pin 53 to the mounting frame assembly 21 by a bracket 54. The arm 52, through a linkage 55, manipulates a valve 56, which, in turn, controls fluid to the hydraulic piston cylinder assembly 34. The linkage mechanism is appropriately set such that the sensor controls the flail unit maintaining the latter at a substantially constant spacing relative to the tree for maximum effect of the flail members in removing limbs from the trees.

Figure 9:
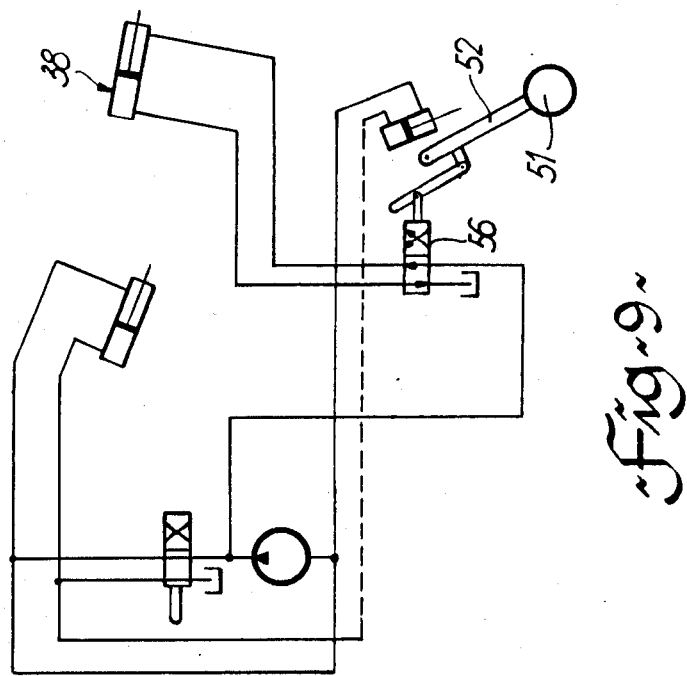
FIG. 9 is a schematic of the hydraulic circuitry for the automatic height control.

In place of the mechanical hydraulic control system illustrated in the FIGS. 7 to 9, height control may be effected by various other means such as full hydraulic systems, some of which are diagrammtically illustrated in FIGS. 10 to 13 inclusive. In each of the embodiments illustrated in FIGS. 10 to 13 inclusive there is a hydraulic pump P1 driven by the motor PS and, through a line L1, supplies fluid pressure to a motor M1 which drives the hub of the flail unit. The physical arrangement of the motor M1 is illustrated in detail in FIGS. 14 and 15 and will be described in detail hereinafter. Fluid for the system is contained in a sump S to which the pump is connected by an infeed line L2. The motor M1 discharges to the sump S through a line L3. A three-way control valve CV is located in the line L1 and has a discharge to the sump S through a line L4. In each of the four different embodiments illustrated in FIGS. 10 to 13 inclusive, line L1 is connected by way of a line L5 to one side of the hydraulic piston cylinder assembly 34 utilized to raise and lower the delimber unit. In each of the FIGS. 10, 11 and 13 the hydraulic cylinder is double-acting while in the system utilized in FIG. 11 the cylinder is single-acting. In the embodiment in FIG. 10, the line L5 is connected to the cylinder on one side of the piston and the cylinder on the other side of the piston is connected by way of a line L6 to an accumulator AC. In the embodiment in FIG. 12, the line L6 is connected to line L1 through an adjustable pressure check valve ACV1 and through a line L7 and adjustable pressure check valve ACV2 to the sump S. In the embodiment illustrated in FIG. 13 the line L6 is connected to the line L1 through a counter-balance valve CBV. In operation in the FIG. 10 embodiment, the pump P1 supplies fluid under pressure to the flail drive motor M1 through the threeway valve CV. With the motor running at no load pressure, the control cylinder 38 is fully extended as illustrated in FIG. 3 and, as the flail chains engage limbs to remove the same, the system pressure rises. With a rise in pressure, fluid through line L5 causes the rod of the piston cylinder assembly 38 to retract forcing the oil from the opposite end of the cylinder into the accumulator AC which is charged to provide an appropriate back pressure for the system. As the rod of the piston cylinder 38 retracts, the motor load decreases and thus there is a pressure drop in the line. Through this system the delimber unit is automatically maintained at an appropriate position relative to trees being delimbed for causing maximum effect of limbing forces by the flail elements utilizing minimum driving force for the motor.

Figure 11:
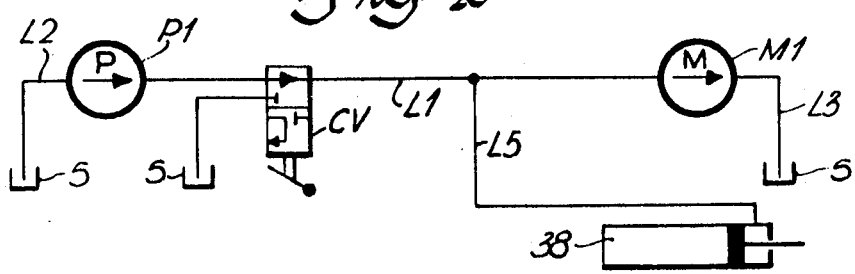

In the embodiment illustrated in FIG. 11, fluid pressure from the pump P1 flows through the valve CV to the flail drive motor M1. The motor M1 is in parallel with the hydraulic cylinder 38 through the line L5 and lifting forces provided by such cylinder oppose gravity of the combined weight and lever arm of the control arm 30 and flail unit attached thereto. The pressures are chosen such that when the flail motor is driving the flail at no load, the flail unit is at its lowermost position and, as the flail elements engage the limbs, load is applied and which increases fluid pressure to the motor. At no load the control cylinder does not have sufficient force to raise the flail and as the load is applied through the action of removing limbs the circuit pressure rises, raising the flail unit to a position where the motor pressure drops. Through this the flail unit is raised and lowered dependent upon work load of the flail drive motor M1.

Figure 12:
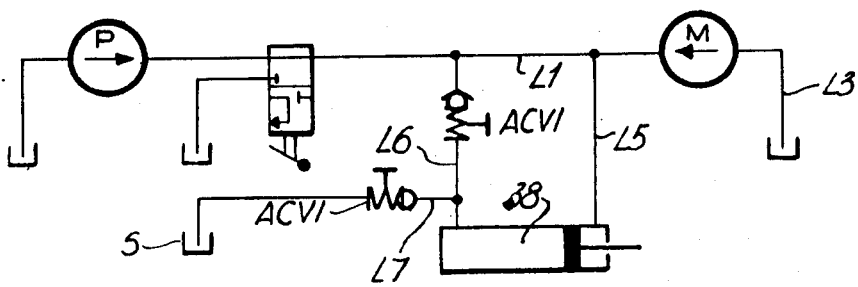

In the system illustrated in FIG. 12 there is provided control of the flail position through the adjustable check valves ACV1 and ACV2. These check valves preferably are operable through a remote control allowing the operator to make adjustment during a limbing operation. The adjustment for these controls may be labeled Black Spruce, Jack Pine, Balsa and White Spruce, all of which require different forces for the removal of limbs. Variations in the setting also may be effected to take into account the difference in type of limbs being removed, for example, small springy limbs as opposed to large limbs which may be two to three inches in diameter or more.

Figure 13:
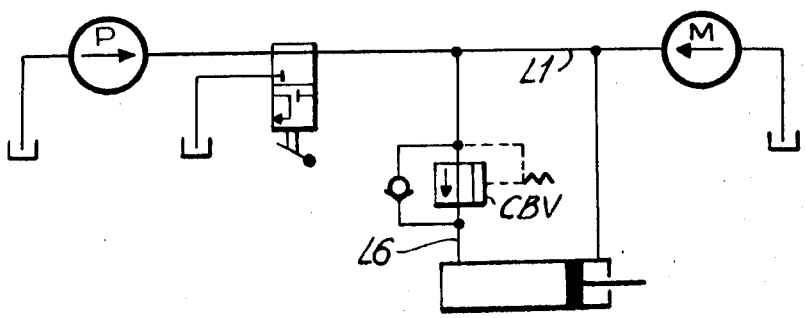

In the system illustrated in FIG. 13 the counter-balance valve CBV intercepts the flow of fluid to the motor and fills the end of the cylinder of the piston cylinder assembly 38 opposite to supply through line L5. The supply of fluid through line L6 is adjusted so as to be sufficient to carry the weight of the flail unit while the motor is in an unloaded state and relieves such circuit when the rod end of the piston overcomes the low pressure. This system is intended to provide accurate, fast response to the control cylinders and flail.

Figure 14:
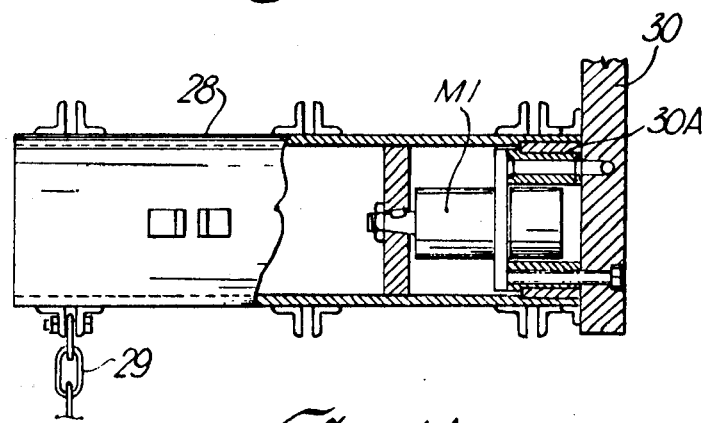
FIG. 14 is a partical sectional view illustrating a drive arrangement for the flail delimber units.
Figure 15:
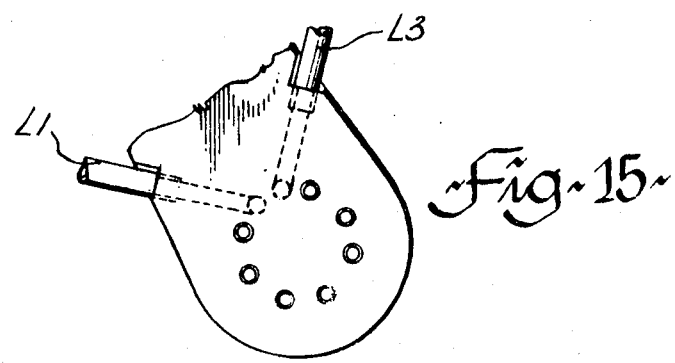
FIG. 15 is an end elevational view of FIG. 14.
Figure 4:
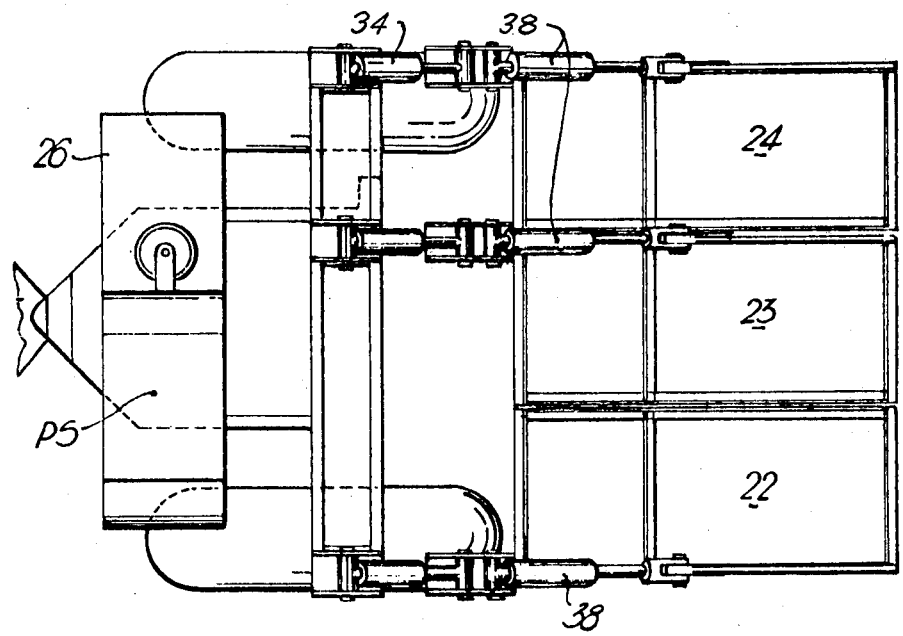
FIG. 4 is a top plan view of FIG. 3.

Referring now to FIGS. 14 and 15, the motor M1 for the respective individual flail units is attached to the arm 30 and projects therefrom into the hub 28 of the flail unit. The hub is journalled for rotation on the arm 30 by a bushing 30A. The lines L1 and L3 for the flow of fluid respectively to and from the motor M1 are connected to the passages in the arm 30 connected appropriately to the motor.

I claim:

1. Apparatus for delimbing trees comprising:
   a. a mobile self-propelled vehicle;
   b. two or more flail delimber units disposed side-by-side and each individually movably mounted on said vehicle for movement in a vertical plane;
   c. means connected to said vehicle and to said flail delimber units for raising and lowering the same independent of one another; and
   d. sensing means controlling said raising and lowering means to automatically maintain a selected relative position between the respective flail delimber units and trees lying on the ground being processed during movement of the vehicle longitudinally along the trees to thereby maximize impact forces of the flail members on the limbs being removed.

2. An apparatus as defined in claim 1 wherein said sensing means is responsive to the physical location of trees relative to the delimber units during processing thereof.

3. An apparatus as defined in claim 1 wherein said sensing means includes a feeler for respective ones of each of said delimber units and wherein said feelers are engageable with the trees being processed during processing thereof.

4. An apparatus as defined in claim 3 wherein said feelers are connected, by way of mechanical linkages, to actuators for said raising and lowering means.

5. An apparatus as defined in claim 1 wherein said sensing means is responsive to driving forces on the flail delimber units during operation of the same to remove limbs.

6. An apparatus as defined in claim 1 wherein said flail delimber units are driven by hydraulic motors, wherein said raising and lowering means comprises hydraulic means and wherein the latter means is responsive to changes in power required to drive said hydraulic motors.

7. An apparatus as defined in claim 1 wherein said flail delimber units are each driven by a hydraulic motor, wherein said raising and lowering means comprises a hydraulic piston cylinder assembly for each of respective ones of said delimber units and wherein the fluid supply for the motor and hydraulic cylinder assembly for each of the respective delimber units are connected in parallel.

8. Apparatus for delimbing trees comprising:
   a. a mobile vehicle;
   b. two or more driven flail type delimber units disposed side-by-side and individually movably mounted on the vehicle for adjustment in a vertical plane.

9. A mobile delimber as defined in claim 8 wherein each of said delimber units comprises a partly circular open bottom housing depending from the free end of an arm pivotally attached to the vehicle for movement about an axis transverse to the direction of travel of the vehicle.

10. A mobile delimber as defined in claim 9 wherein said arm is pivotally attached adjacent the free end of a boom member which in turn is pivotally attached to the vehicle and including hydraulic piston cylinder means associated with the respective boom and arm member to controllably pivot the same about their respective pivots.

11. An apparatus as defined in claim 9 wherein the flail unit consists of a hub journalled for rotation in a housing and having a plurality of flexible members attached at one end thereof to the hub and wherein said hub is driven by a hydraulic motor located within the hub.

* * * * *